United States Patent

[11] 3,618,018

[72] Inventors David L. Johnston;
Paul E. Nelson, both of Rochester, Minn.
[21] Appl. No. 829,397
[22] Filed June 2, 1969
[45] Patented Nov. 2, 1971
[73] Assignee International Business Machines Corporation
Armonk, N.Y.

[54] UNFORMATTED SCANNING IN A CHARACTER-RECOGNITION SYSTEM
18 Claims, 6 Drawing Figs.

[52] U.S. Cl. .......... 340/146.3AH, 235/61.11 R
[51] Int. Cl. .......... G06k 9/04
[50] Field of Search .......... 340/146.3; 235/61.11

[56] References Cited

UNITED STATES PATENTS 3,295,105 12/1966 Gray et al. .......... 340/146.3
3,458,688 7/1969 Garry et al. .......... 235/61.11

OTHER REFERENCES

Cutaia, A., " Scanning Error Detection and Recovery," Vol. 9. No. 5 IBM Technical Disclosure Bulletin, Oct. 1966, pp. 481–483

Stockdale, N. S., " Format Control Apparatus," Vol. 9 No. 12, IBM Technical Disclosure Bulletin, May 1967, pp. 1765–1768.

*Primary Examiner*—Maynard R. Wilbur
*Assistant Examiner*—William W. Cochran, II
*Attorneys*—Hanifin and Jancin and James Michael Anglin ABSTRACT: Scan-control apparatus responsive to a format word specifying boundaries of a document field to be scanned generates a series of search patterns for characters within the field. A "read" command causes a scanning beam to seek the intersection of horizontal and vertical boundaries contained in the format word. A line-search scan travels downward therefrom until black video is detected. A character-search scan then moves horizontally to establish the beginning of a character line. The first character is normalized, a recognition scan is initiated, and the vertical position of the line is digitally recorded. Reaching the format end-of-line boundary, or detection of a number of blank spaces, terminates the "read" command. Further "load-format" and "read" commands cause the beam to seek the format word horizontal boundary and the recorded vertical position. The field is terminated when the vertical format word boundary is attained. Tests for document and read-window ends are provided. Several types of format words enhance the flexibility of the system.

INVENTORS
DAVID L. JOHNSTON
PAUL E. NELSON
BY
[signature]
ATTORNEY

UNFORMATTED SCANNING IN A CHARACTER-RECOGNITION SYSTEM

BACKGROUND OF THE INVENTION

One of the major objectives of current character-recognition systems is to minimize the constraints which must be placed upon their input data. Current needs stress the requirements for flexibility in such areas as multifont recognition, accurate separation of characters from each other, wide-range size normalization, and several others.

One aspect of this objective concerns the physical arrangement of characters upon the documents to be read. Consequently, a recent trend in optical character readers involves the use of format control to achieve great flexibility in the document formats which a single reader may handle. Commonly assigned U.S. Pat. No. 3,337,766, for instance, discloses a format-control system for calibrating an optical scanner to the position of each individual document to be read. This patent also demonstrates the use of selectable scanning modes. Commonly assigned application, Ser. No. 672,551, filed Oct. 3, 1967 now Pat. No. 3,553,646, discloses apparatus for digitizing the above operations in order to simplify the communications between the recognition system and a data processor and in order to simplify the storage of format-control information.

The above systems enable a scanner to pick out areas containing relevant information without needlessly scanning the entire document. These and other prior-art format-control schemes, however, still require a great deal of a priori information concerning the layout of an input document. One major disadvantage is that the position of each line of data must be specified in a separate format word. Furthermore, each line position must be specified in relation to a preprinted reference mark on the document itself. The speed and flexibility advantages of prior format-control systems are therefore at least partially offset by the complexity and rigidity required of the format words.

Commonly assigned application, Ser. No. 829,409 by W. W. Hardin and P. J. Traglia, now Pat. No. 3,571,797 filed on June 2, 1969, partially alleviates the foregoing disadvantages by providing a format-control apparatus responsive to a format word containing a set of coordinates outlining a document area within which data may appear at any location. That scheme, while it eliminates some of the more onerous restrictions of prior devices, still requires, for instance, a disadvantageous "line-idle" scanning mode (explained hereinbelow) and further requires each format word to specify the complete boundary of the area to be scanned.

SUMMARY OF THE INVENTION

Against the foregoing background, the present invention advances the state of the scan-control art by providing novel apparatus responsive to a format word which is capable of specifying a multiline field on a document to be read.

Another object of the invention is to provide apparatus for digitally recording the location of lines found by the scanner.

An additional object of the invention is to provide apparatus for scanning document areas whose boundaries are not completely specified, at any single time, by the format word.

A further object is to provide apparatus for rapidly searching and reading a document for which no a priori format information is available to the scanner.

Still a further object of the invention is to provide means for automatically sensing the end of a document positioned in a read window.

The foregoing and other objects of the invention are realized by the combination of a decoder unit responsive to a format word for producing representations of boundaries of a document field, a detection unit for sensing the location of a scanning beam relative to these boundaries, and a scan-selection unit which causes a beam control to move the scanning beam sequentially in a series of predetermined patterns. The scan-selection unit contains a seek generator for positioning the beam relative to at least one of the format-word boundaries, a line-search scan generator, a strike generator for positioning the beam relative to black video detected during the line-search scan, and a recognition scan generator responsive, either directly or indirectly, to the strike generator. The invention additionally comprises a storage unit responsive to the strike generator for recording a digital representation of a coordinate of data found by the line-search scan. A further feature provides means responsive to the strike generator for producing an end-of-document test scan in which a document-end condition is detected by sensing the proportion of black video over the test scan. Still further features of the invention provide means for subsuming character-search, normalizing, initializing, line-riding and high-speed skip patterns in a variable-format scan-control apparatus.

The foregoing and additional objects and features of the present invention, as well as modifications obvious to those skilled in the applicable arts, will appear from the following detailed description of a preferred embodiment of the invention, taken in conjunction with the accompanying drawings.

DETAILED DESCRIPTION

Figure 1:
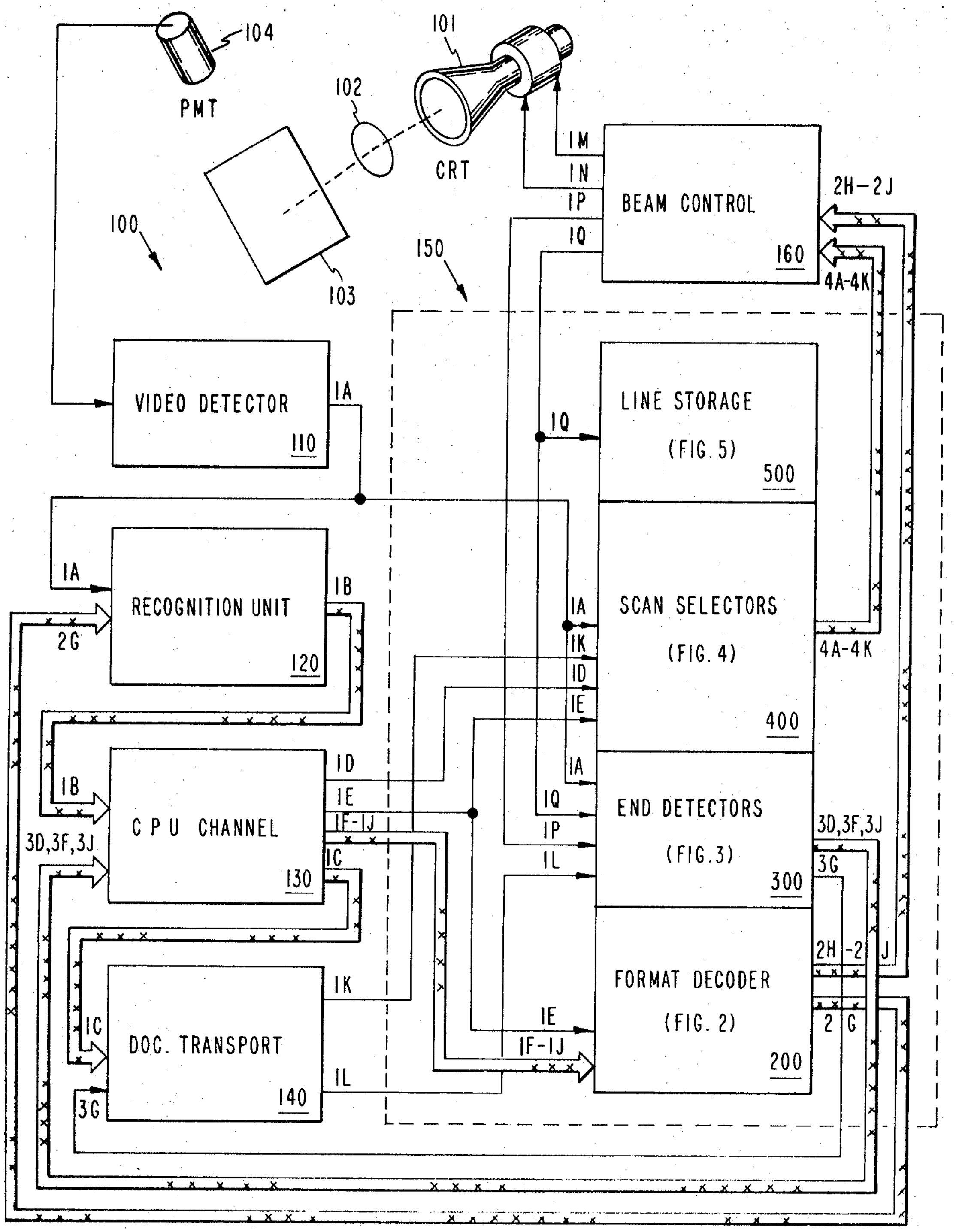
FIG. 1 is a block diagram of scan-control apparatus according to the invention, showing connections to other parts of a character-recognition system.

Referring more particularly to FIG. 1, the reference numeral 100 denotes generally a character-recognition system in which a scanning beam generated by a cathode-ray tube (CRT) 101 is focused through a lens 102 onto a document 103. A photomultiplier tube (PMT) 104 collects diffuse reflected light from the document and converts it into an electrical signal for a video detector 110. A digitized video signal from detector 110 proceeds through line 1A to a recognition unit 120 for analysis. Throughout the following description, the phrase "black video" will refer to a video signal indicative of the information desired to be read, and "white video" to a signal indicative of a background; obviously, any other combination of colors or shades may be employed.

Digital codes of the recognized characters then proceed on lines 1B to a central processing unit (CPU) channel, or data processor, 130. A document transport 140 controls the physical movement of document 103 in response to signals from the CPU channel appearing on line 1C.

The scan-control apparatus 150 of the present invention receives video signals from detector 110 on line 1A; it receives serial "read" commands, "load-format" commands and format words from channel 130 on lines 1D, 1E and 1F–1J respectively, and accepts "document-in-place" signals over line 1K and "last-window" signals over line 1L from transport 140. These inputs cause unit 150 to produce beam-movement signals on lines 4A–4K for the use of a conventional beam control 160. Additional signals on lines 2H and 2J cause control 160 to select the proper field rotation and read direction. Unit 160 then develops horizontal and vertical deflection voltages for CRT 101 on lines 1M and 1N. Feedback signals indicative of the horizontal and vertical coordinates of the scanning beam are developed on lines 1P and 1Q. Scan-control apparatus 150 also has an output line 3G which informs transport 140 when the scanning beam reaches the lower end of a read window without having detected the end of document 103.

Further outputs 3D, 3F, and 3J from apparatus 150 signal the existence of various end conditions to the channel 130. More specifically, line 3D terminates the "read" command from line 1E when the end of a line of characters has been reached; line 3F indicates the end of the document; and line 3J indicates the end of a particular field on the document.

For convenience of description, the scan-control control apparatus 150 is divided into four units 200, 300, 400 and 500. Bearing in mind the description of the overall system diagram of FIG. 1 and the preceding outline of the operation of the invention, the individual units 200–500 will now be described in greater detail.

THE DECODER UNIT

Figure 2:
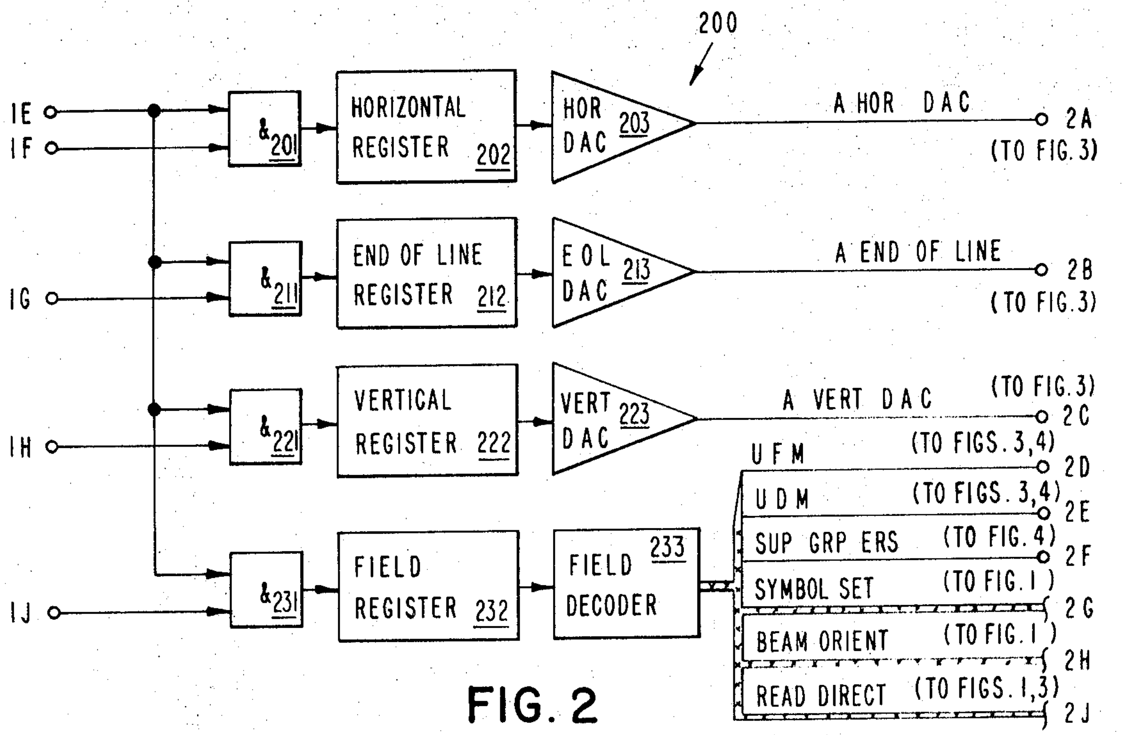
FIG. 2 is a diagram of the format decoder of FIG. 1.

The purpose of decoder unit 200, FIG. 2, is to translate a digital format word from CPU channel 130 into a number of analog and digital output signals indicative of the boundaries and the types of fields to be read. To this end, four format-word bytes appearing in parallel on lines 1F–1J are passed through AND gates 201, 211, 221 and 231 by a "load-format" command appearing on line 1E. The first byte is stored in a register 202 and is converted to an equivalent analog voltage by digital-to-analog converter (DAC) 203. The resulting analog signal appearing on line 2A represents the horizontal coordinate or boundary of the beginning of the desired field; this coordinate will be referred to hereinafter as the "horizontal boundary". The second byte of the format word is stored in register 212 and converted to an analog value by DAC 213. The voltage on line 2B represents a horizontal coordinate or boundary of the end of the desired field; this coordinate will be termed the "end-of-line boundary". The analog signal on line 2C results from the processing of the third byte by register 222 and DAC 223. This voltage corresponds to a vertical boundary of the field; as will be more fully described hereinafter, this boundary selectively represents either the beginning or the ending vertical boundary of the field to be read.

The fourth byte of the format word, stored in register 232, contains digital information as to the type of field to be read. The concept of specifying field-type information in a digital word is explained more fully in the aforementioned U.S. Pat. application, Ser. No. 672,551. A digital decoder 233 extracts the information contained in register 232. The decoded signals germane to the present invention are shown on lines 2D–2J. A signal (UFM) appearing on line 2D signifies that scanning is to take place in an unformatted-field mode. This mode confines the search for data to a preselected area of a document. A signal (UDM) on line 2E directs the scan-control apparatus to search the entire document (subject to certain time-saving devices) for any data which may appear thereon. A signal (SUP GRP ERS) on line 2F causes a conventional group-erasure mark to be disregarded. Information (SYMBOL SET) appearing on line 2G causes recognition unit 120 to select a particular font of symbols for its analysis. For increased versatility, line 2H (BEAM ORIENT) specifies whether the character lines on document 103 run horizontally (normal rotation) or vertically (+ 90 rotation). Since these signals merely cause the beam-control apparatus 160 to interchange its horizontal and vertical output signals 1M and 1N (FIG. 1), the word "horizontal", when used in connection with the scan-control apparatus 150, must be taken in a more general sense as meaning a direction parallel to character lines to be read. Correspondingly, the word "vertical" must be taken to signify a direction transverse to the character line. Further scanning flexibility may be attained by specifying on line 2J (READ DIRECT) whether character lines are to be read from right to left (READ FWD) or from left to right (READ BK). This signal does affect the scan-control apparatus 150, as will be more fully described.

THE DETECTION UNIT

Figure 3:
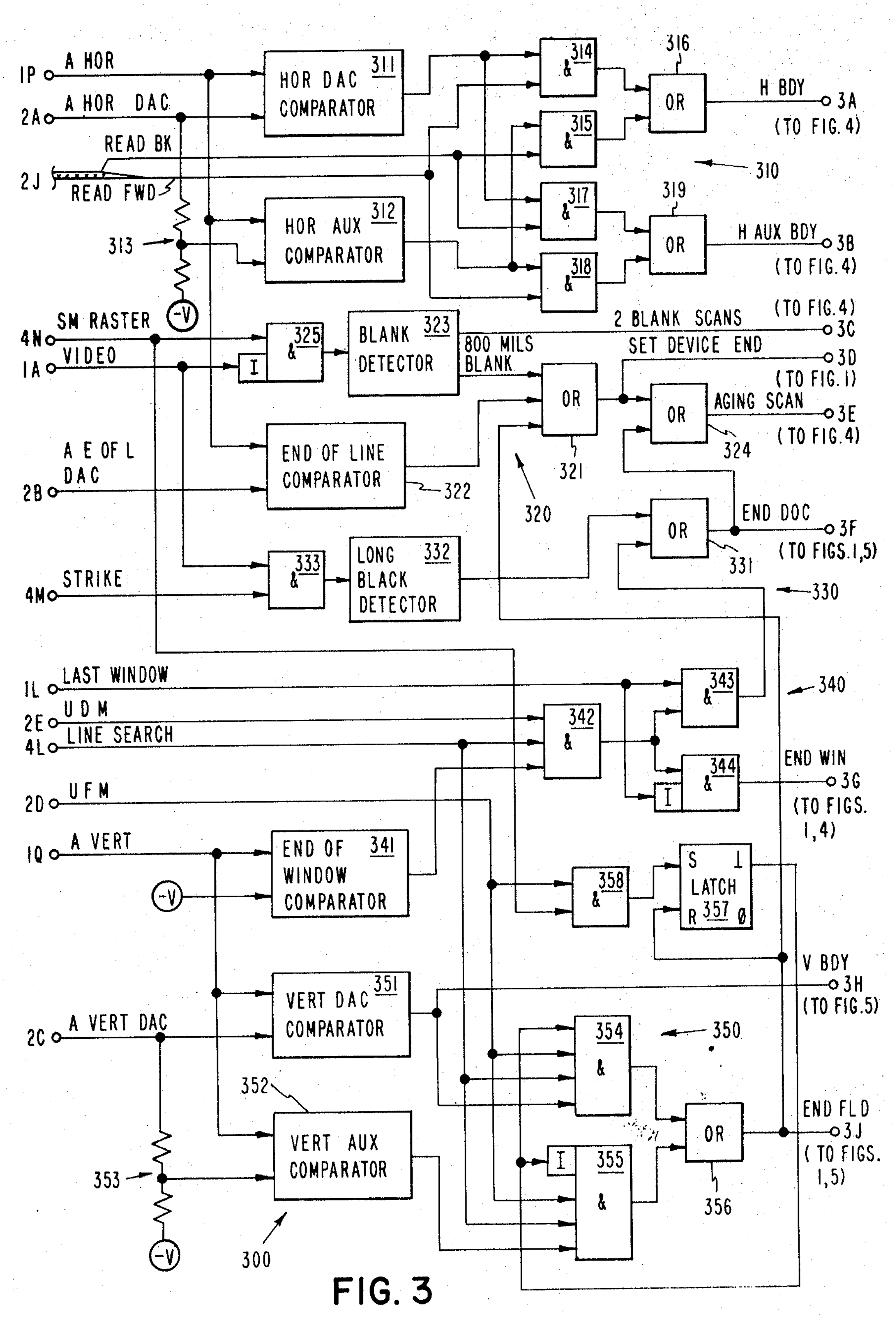
FIG. 3 shows the detection unit of FIG. 1.

The outputs 2A–2F and 2J of decoder unit 200 are used by the detection unit 300, FIG. 3, to determine the positional relationship of the scanning beam of CRT 101 with respect to various field boundaries in light of the selection of a particular field type by a format word.

A horizontal boundary subunit, indicated generally by the numeral 310, compares the horizontal position of the scanning beam on line 1P with the analog boundary signal on line 2A. Comparator 311 produces a signal indicating that the scanning beam is to the right of the coordinate represented on line 2A. Comparator 312, fed from line 2A via voltage divider 313 and from a constant-voltage source −V, indicates when the scanning beam is to the left of a location which is stationed one inch to the left of the boundary coordinate represented by line 2A. These two comparator outputs are connected through a logical DPDT switch, comprising AND and OR blocks 314–319, to a pair of output lines 3A and 3B. The read-direction signal appearing on line 2J controls the position of this switch, so that the output of comparator 311 is connected to line 3A and the output of comparator 312 is connected to line 3B when the "read-forward" line is energized, and the connections are reversed when the "read-backward" line is active. This arrangement conserves hardware in that the relative positions of the horizontal boundary and the horizontal auxiliary boundary remain unchanged under a reversal of read directions. In specifying the format word, however, the programmer must remember that the actual location of the horizontal beginning of the field is 1 inch to the left of the coordinate specified on line 1F (FIG. 2) when the scanner is set up to read from left to right.

A second subunit 320 of detection unit 300 informs the CPU channel 130 over line 3D when the horizontal end-of-line boundary has been attained by the scanning beam. This may occur in one of two ways. First, line 3D may be activated through OR 321 when comparator 322 senses that the horizontal position of the CRT beam, as represented on line 1P, has passed the format-word end-of-line coordinate from line 2B. Secondly, it is desirable to terminate the scanning of a character line when the recognition scan has failed to detect any data for a predetermined distance. For this purpose, a blank detector 323 of conventional design is enabled by the presence of a recognition-scan signal on line 4N. The blank detector transmits a signal to AND 321 whenever continuous white video on line 1A persists for a time which is equivalent to 800 mills of distance on the document. This feature eliminates the full scanning of a line which almost certainly contains no further data.

Figure 6:
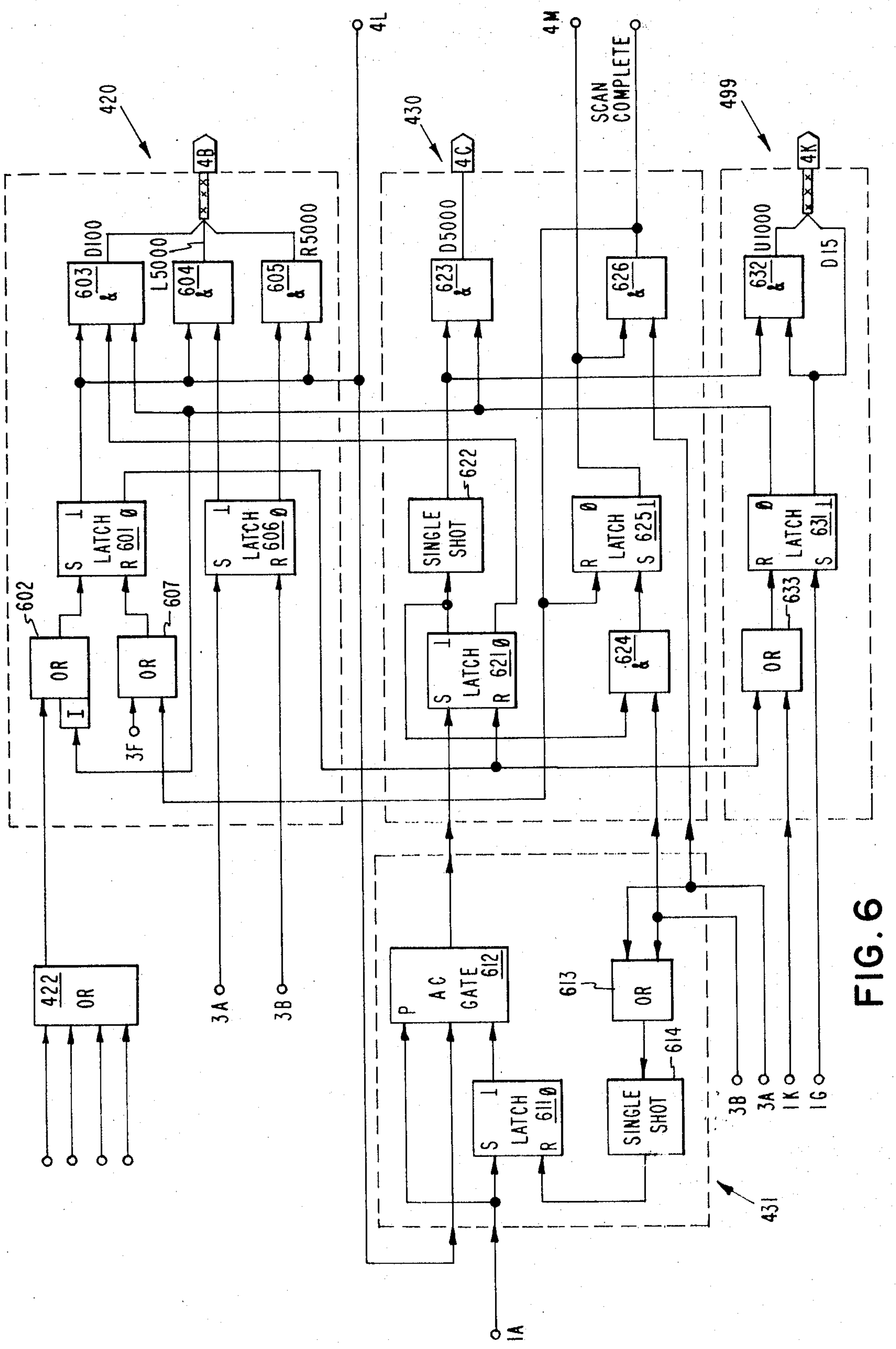
FIG. 6 shows in greater detail several of the scan generators of FIG. 4.

Another subunit 330 communicates to CPU channel 130 over line 3F the fact that the end of a document has been reached. OR gate 331 allows two methods for sensing this condition. The first method utilizes the fact that the mechanical document carrier has a dark color, whereas the document itself is predominately light in color. Therefore, a special test scan, to be described more fully in connection with FIGS. 4 and 6, sweeps horizontally back and forth over a predetermined area whenever black video is detected during a search for character lines. The activation of this test scan enables long-black detector 332 via line 4M. Then, if the black video received on line 1A exceeds a predetermined duration, detector 332 produces an output to OR 331 to signal an end-of-document condition. AND 333 communicates with OR 331 to provide the second method for signaling document termination. Document transport 140 contains a set of conventional sensors capable of signaling the location of a document on the transport relative to the read window scanned by the CRT. One of these sensors produces a signal (last window) on line 1L. This signal, which provides one of the inputs to AND 343, signifies that the last portion of the document is currently inside the read window. Then, when the format word indicates on line 2E that the scanner is in the unformatted document mode (UDM), and when the scanning beam reaches the end of the last window during a search for character lines, the other input to AND 333 is satisfied, producing an output through OR 331 on line 3F. This second method conserves scanning time in that the beam need not search all the way to the end of the document when its physical position indicates that it contains no further data to be read.

Next, a subunit 340 detects when the scanning beam reaches the lower vertical edge of the read window, indicating that the document must be moved for any further scanning. This condition occurs when the vertical CRT deflection voltage on line 1Q activates comparator 341, whose other input is a fixed reference voltage representing the electrical end of the window. The end-of-window condition is sensed by AND 342 from the output of comparator 341 and from signals on lines 2E and 4L which indicate that the scanner is searching for lines while in its unformatted-document mode. If the transport indicates over line 1L that the window being scanned is the last window of the document, AND 343 informs OR 341 that the end of the window is also the end of the document. If, however, the current window is not the last window, then AND 344 activates output line 3G to cause transport 140 to move the document to a new position in the read window.

Subunit 350 of detection unit 300 processes the signal on line 2C to produce a vertical-boundary signal and a vertical auxiliary boundary signal. Lines 1Q and 2C feed vertical boundary comparator 351 to produce a signal on line 3H when the scanning beam reaches the vertical coordinate specified in the third byte of the format word. This signal will be employed to position the scanning beam vertically at the beginning of a field or of a document. A vertical auxiliary comparator 352 produces a signal indicating the relationship of the scanning beam to a position 1 inch below the vertical boundary specified on 2C. The 1 inch interval is obtained from line 2C by voltage divider 353 connected to a constant reference potential.

The vertical coordinate represented on 2C may represent either the beginning or the end of a field to be read. This objective is accomplished by subunit 350 in the following manner. Gates 354–356 form a logical SPDT switch which operates, when the scanner is searching for lines (i.e., when line 4L is up) in its unformatted-field mode (UFM) to couple either comparator 351 or comparator 352 to the end-of-field line 3J. Line 3J also activates line 3D through OR gate 321 since channel 130 requires this condition for proper sequencing. The state of the switch 354–356 is controlled by a line-found latch 357, which is set by AND 358 when inputs 2D and 4N indicate that a valid character line has been found within an unformatted field. Latch 357 is reset at the end of each field by OR 356. When the scanning of a new field begins, latch 357 is thus in its reset state; AND-gate 354 is thereby rendered inactive so that the output of comparator 351 is ineffective to provide a signal to line 3J. The output of comparator 352, however, is able to pass through gates 355 and 356 to provide an artificial lower field boundary 1 inch below the format-word coordinate specified on line 2C. That is, when no valid character line has yet been found within a particular field, the lower field boundary is taken as a position 1 inch (or any other convenient distance) below the position specified on line 2C; but, when a line has been found within the field, the address specified by line 2C becomes the lower field boundary. The manner in which this result occurs will now be discussed in connection with FIG. 5.

THE LINE-STORAGE UNIT

Figure 5:
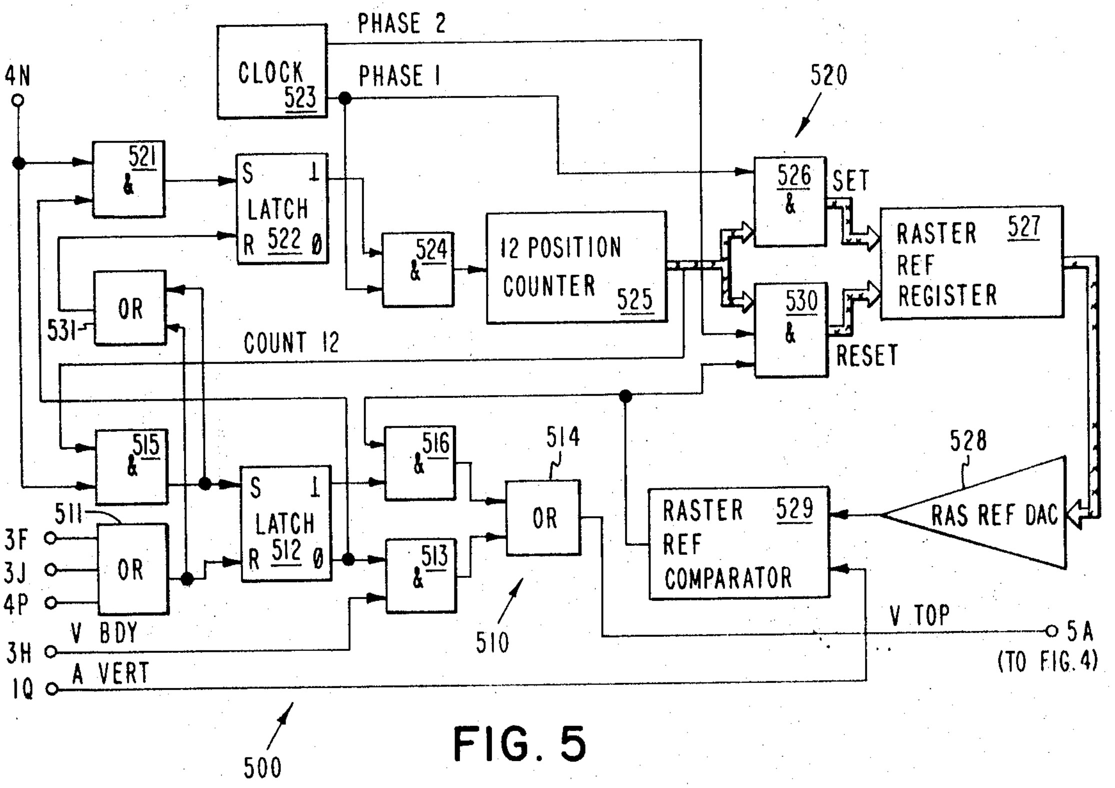
FIG. 5 is a diagram of the line-storage unit shown in FIG. 1.

FIG. 5 illustrates in greater detail the line-storage unit 500 of FIG. 1. A first subunit 520 thereof forms a gated digital recorder for storing a vertical coordinate related to the position of a character line on the document. The second subunit 510 acts as a switch to select either line 3H or the output of recorder 510 as the upper vertical boundary of the field currently being searched. The result of this choice appears on output line 5A. At one of several points during the scanning sequence to be discussed in connection with FIG. 4, inputs on lines 3F, 3J and 4P cause OR 511 to reset a latch 512. The reset state of this latch causes gates 513 and 514 to pass the signal appearing on line 3H to output line 5A; that is, the reset state of latch 512 causes the upper vertical boundary of the document field to be defined by the format-word vertical coordinate on 2C, via comparator 351 and line 3H. The set state of latch 512 is initiated by AND 515, which is energized during a recognition scan (line 4N) upon the receipt of a positive transition indicating that the recorder 520 has completed the storage of a character-line coordinate. The set state of latch 512 then causes the recorder output to pass through gates 516 and 514 to output line 5A. Consequently, the set state of latch 512 causes the upper vertical boundary of the document field to be defined by the line-storage unit 500, rather than by the format-word signal on line 3H.

The storage of a coordinate in subunit 520 begins with a positive transition on line 4N when latch 512 is in its reset state. At this point, AND 521 sets latch 522. The first phase of a clock signal from 523 then causes AND 524 to cycle counter 525 through a number of positions equal to the number of bits to be digitized. In the present instance 12 bits are employed. The output of counter 525 and the first phase of clock 523 cause a bank of 12 AND gates 526 sequentially to set each position of register 527 to a binary "one" state. The digital value appearing in the register is converted to an analog voltage by DAC 528, whose output is compared with the current vertical position of the scanning beam (line 1Q) in comparator 529. The result of this comparison allows the 12 AND gates 530 to reset a register bit to binary "zero" during a second clock phase when a signal is generated by comparator 529 during its corresponding count. When the register reaches its last significant position, a pulse from the counter enables AND 515 to set latch 512. This action removes one of the inputs from AND 521, and also provides an input to OR 531 to reset latch 522. The other input of OR 531 is taken from OR 511. The resetting of latch 522 disables AND 524 in order to prevent recycling of the counter 425 until the storage of another line position is desired. Counter 525 then moves to an "idle" position in order to disconnect ANDs 526 and 530 therefrom until AND 524 is again activated.

Comparator 529 is used both to set up register 527 and to provide a signal on output line 5A for controlling the scan-selection unit 400. These two functions do not interfere with each other because the information on line 5A may be utilized only at a point in the scanning sequence which is different than the point at which the register 527 may be set up. Therefore, line-storage unit 500 provides a means for recording a character-line vertical coordinate and then for selecting this coordinate as an upper boundary of an area to be searched for further lines.

THE SCAN-SELECTION UNIT

Figure 4:
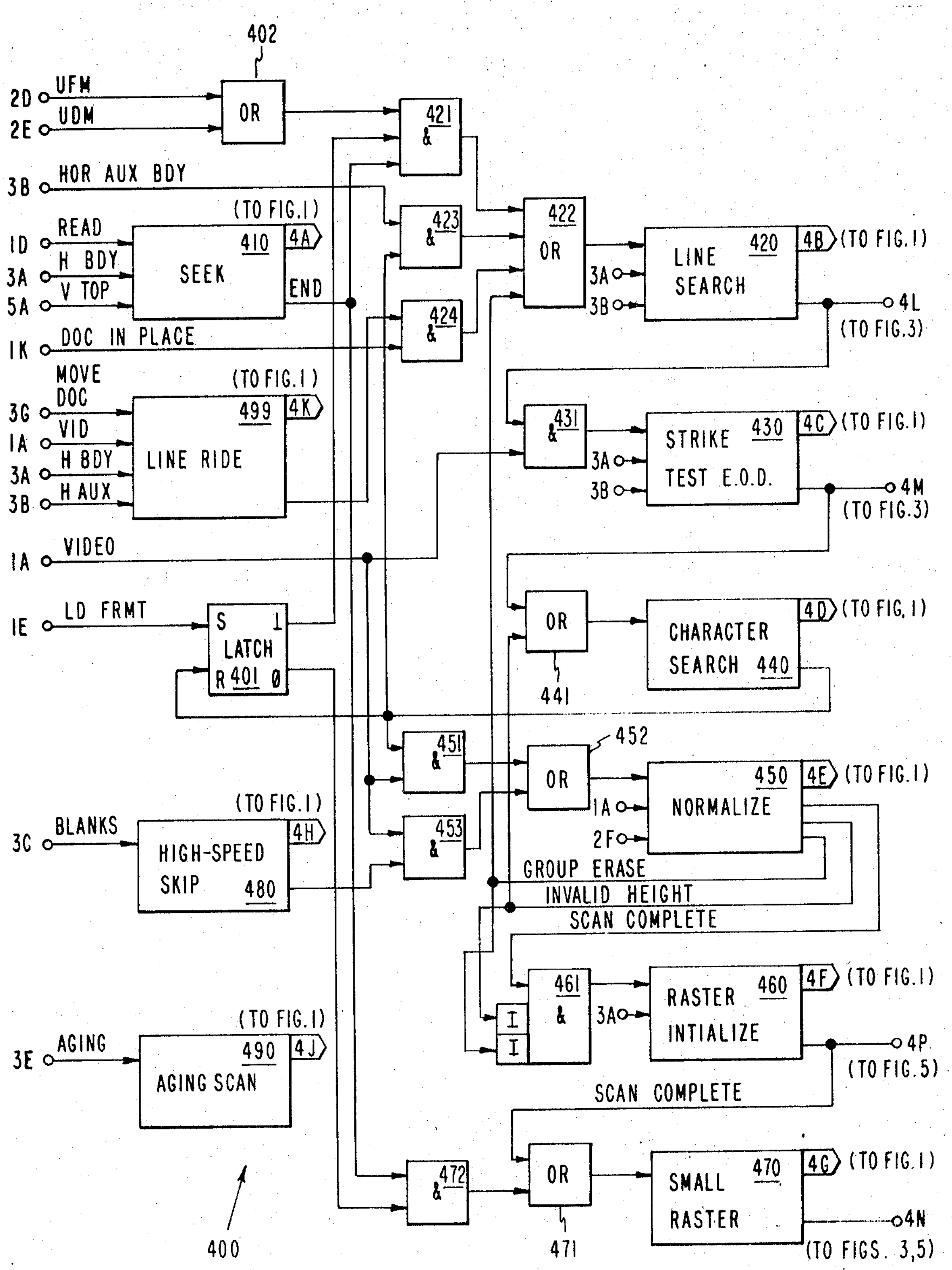
FIG. 4 illustrates the scan-selection unit of FIG. 1.

The scan-selection unit 400, FIG. 4, contains a number of scan generators and associated logic circuits for generating a sequence of scans across the face of a document to be read. The order of the scans in the sequence is controlled by the logic shown in FIG. 4 and by the inputs 1A (video), 1K (a "-document-in-place" signal from transport 140), 1D (the "read" command) and 1E (the "load-format" command). The document areas over which these scans occur, however, are determined by various outputs from the units 200, 300 and 500, which derive ultimately from the format word from CPU channel 130 and from the results of previous scan sequences selected by the unit 400.

An initial scanning sequence begins when CPU channel 130 issues a "load-format" command on line 1E, which sets a next-line latch 401. If the format word indicates that one of the unformatted modes (UFM or UDM) is to be employed, OR gate 402 is activated. The channel next issues a "read" command on line 1D to activate a seek generator 410. This generator causes line 4A to move the scanning beam in a conventional manner to the intersection of the horizontal boundary (3A) and the upper vertical boundary (5A) of the particular area to be searched. An "end" signal is produced when the beam has reached the proper position.

The aforementioned signals from latch 401, OR 402 and seek generator 410 then activate a line-search generator 420 via gates 421 and 422. Generator 420 produces conventional signals on an output 4B to cause beam control 160 to move the scanning beam back and forth between the horizontal boundary (3A) and the horizontal auxiliary boundary (3B) at a rapid rate, and downwardly at a slower rate. Another output 4L is active as long as generator 420 is energized.

When the line-search scan hits black video, a strike generator 430 is energized by AND 431. This generator, whose configuration will be described more fully below, produces an output on line 5C to increment the scanning beam downwardly by a predetermined distance (e.g. 40 mils) from the point at which video was detected and to move it to the horizontal boundary. Generator 430 then moves the beam laterally from the horizontal boundary to the horizontal auxiliary boundary and back again, while activating output line 4M. Line 4M enables long-black detector 332 (FIG. 3) to determine the amount of black video present during this latter scan. That is, strike generator 430 recognizes the possibility that the black video detected during line searching may have been caused by movement of the scanning beam off the end of the document and onto the dark bed plate; an excessive amount of black video during a horizontal sweep will then indicate positively that the end of the document has been attained.

If an end-of-document condition is not detected, the successful completion of the test scan causes OR 441 to activate character-search generator 440. This generator produces, by conventional means, a scan pattern (line 4D) which moves alternately upwardly and downwardly over a small distance and horizontally into the document field, starting at the horizontal boundary. A signal indicating that the character-search scan is in progress also resets latch 401. This signal additionally enables AND 423, so that, if the horizontal auxiliary boundary is passed, gates 422 and 423 will reactivate line-search generator 420. That is, this condition indicates that the video detected by strike generator 430 was a speck of dirt or ink splatter, rather than a valid character.

On the other hand, the detection of video (1A) during the character-search scan energizes gates 451 and 452 to cause normalizing generator 450 to scan the detected video to determine its height and width. The details of such a generator may be found in commonly assigned application, Ser. No. 790,616; the particular normalizing pattern employed, however, is not important to the present invention. It is conventional practice in optical character readers to provide that a long horizontal mark drawn through more than one character is a signal for the reader to disregard the entire line of characters in which the mark appears. Therefore, in the absence of a suppression signal on line 2F, generator 450 will produce a "group-erase" output whenever the width of a character exceeds a predetermined amount. The group-erase symbol terminates the normalizing scan and energizes OR 422 to begin a search for further character lines. Generator 450 also produces an "invalid-height" signal whenever the detected video has less than a predetermined vertical dimension. This condition, unlike the false-detection condition discussed in connection with generator 430, usually results from the fact that the first character of the line is a so-called "small character", i.e., a period, a dash, etc. Accordingly, the "invalid-height" signal passes through OR 441 to continue the character-search scan in the same line. Character searching and character normalizing then continue to alternate until either the horizontal auxiliary boundary is passed (as discussed above) or until the completion of a normalizing scan on a character which has neither an invalid height nor an excessive width, at which time gate 461 is satisfied.

The activation of gate 461 passes a signal over a line 4P to reset latch 512 in line-storage unit 500, as discussed previously. This output also causes an initialization generator 460 to return the beam to the horizontal boundary (3A), and to increment it downwardly by a small, predetermined amount. Attaining this position causes a "scan-complete" signal to start a recognition-scan generator 470 via OR gate 471. It will be appreciated at this point that, although generator 470 is immediately responsive to the output of generator 460, its ultimate precursor is strike generator 430. The recognition scan may be of any convenient type; it is here particularized as a small raster for discussion purposes. That is, generator 470 produces signals on line 4G to sweep the beam rapidly up and down over a predetermined distance just above the point sought by generator 460 and to sweep horizontally into the field at a slower rate. The timing of the raster is synchronized with a shift register and a timing ring in recognition unit 120 (FIG. 1) as in conventional practice. Recognition scanning preferably commences at the horizontal boundary, rather than at the horizontal location of the first valid character sensed by generator 450, in order to pick up any small characters which may have been missed in the normalizing process. Output line 4N of generator 470 instructs line-storage unit 500 (FIG. 5) to record the vertical coordinate of the point sought by initialization generator 460. The positioning of this point below the bottom of the character line ensures that the next-line search scan will not merely reread this line. Line 4N further enables blank detector 323 of detection unit 300 to search for blank scans.

The small-raster recognition scan now continues until comparator 322 senses that the format-word end-of-line boundary has been passed, or until blank detector 323 senses that continuous white video has persisted for a time equivalent to the horizontal distance occupied by two characters of normal width. In the latter event, line 3C starts high-speed skip generator 480 to move the scanning beam rapidly (e.g., about 10 times faster than the recognition scan) in a horizontal direction. This scan may take any one of a number of forms; for the present discussion, it may be assumed to have the same pattern as the character-search scan. During the high-speed skip, generator 480 enables AND 453 to produce an output upon the detection of black video. This output indicates that further characters have been found within the character line, and causes generator 450 to normalize the detected character. The scanning sequence then continues as discussed previously, depending upon the results of the normalization scan. Alternatively, the output of gate 453 could be coupled to generator 460 or to generator 470; it is considered preferable, however, to renormalize the data encountered in such a high-speed scan. If the high-speed skip continues past the end-of-line boundary, comparator 322 will of course terminate the line. But, if blank detector 323 indicates on a second output thereof that the high-speed skip has continued for a distance of 800 mils, the remainder of the line is assumed to be blank, and the scanning is unconditionally terminated through gate 321, even though the end-of-line coordinate has not been reached. Thus, gate 453 is effective to cause renormalization of detected video only within a predetermined distance from the beginning of the high-speed skip.

The termination of a character line for any reason causes OR 324 to energize an aging-scan generator 490. An aging scan, more fully explained in commonly assigned application, Ser. No. 672,550, is a large-area scan which avoids the preferential aging of certain parts of the CRT phosphor. One of the major advantages of the present invention is the substitution of this type of scan for a conventional line-idle scan, in which the beam travels repetitively back and forth over a single character line until the scanner is directed to a new line. Such a substitution is made possible in the present invention by the provision of line storage unit 500.

When the end of a line is signaled to CPU channel 130 over line 3D, the channel may respond in one of a number of ways. The channel may have been programmed to accept only a predetermined number of character lines within a given field; in this instance, the channel may begin a new field with a new format word, even though detection unit 300 has not yet signaled that the end of the present field or the end of the document has been reached. Alternatively, the channel 130 may respond by issuing only a "read" command over line 1D to the scan-selection unit 400. This occurs when it is desired to reread the line which has just been read. Then, since latch 401 is still in its reset state from the preceding scan sequence, the end of the seek scan initiated by line 1D will activate AND 472 rather than AND 421. Since seek generator 410 has positioned the beam at the vertical location recorded in line-storage unit 500, the activation of small-raster generator 470 through gates 471 and 471 will cause the recognition scan to travel down the line previously read.

In the normal course of events, however, it will be desired to search for further character lines after the scanning of one line has been completed. This result is accomplished by issuing a "load-format" command on line 1E to reset latch 401 and by issuing a subsequent "read" command on line 1D. The "read" command will then initiate another scanning sequence similar to that described above. If, during the line-search scan of this second sequence, the scanning beam passes below the vertical coordinate specified by the control word, an end-of-field signal will be communicated to the CPU channel 130 over line 3J. This signal will also reset line-found latch 357 and provide an end-of-line signal, as described above. It will be recalled that an end-of-field signal on 3J will also be generated if the line-search scan has encountered no character lines before the scanning beam crosses the vertical auxiliary boundary as determined by comparator 352. Another condition which will cause the channel 130 to issue a new format word is the detection of the end of a document by a signal on line 3F.

Another departure from the normal course of events occurs when an end-of-window signal appears on line 3G. It should be noted here that the line 3G cannot be activated when the format word has specified an unformatted-field mode (UFM), just as 3J cannot be activated when an unformatted-document mode (UDM) has been selected. Thus, an unformatted field cannot span two successive windows; on the other hand, the vertical boundary of the format word cannot terminate the scanning of a document in the unformatted-document mode. That is, the vertical-boundary byte can only specify the upper boundary of an unformatted document; and, once the line-found latch 357 is set in this latter mode, the vertical-boundary byte becomes a dummy variable for this document.

The signal on line 3G commands the transport 140 to increment the document through the read window. It further energizes a line-ride scan generator 499 in scan-selection unit 400. The line-ride scan pattern is similar to that produced by the line-search generator 420, in that it sweeps rapidly back and forth between the horizontal boundary and the horizontal auxiliary boundary, and downwardly at a slower rate. It differs, however, in that the detection of black video on line 1A causes the beam to jump rapidly upward for a predetermined distance (e.g., 10 mils), and then to restart the downward sweep. Although this scan follows the same pattern as the conventional line-idle scan which is used to hold the vertical position of a line until the scanning of a new character line is begun, the disadvantageous preferential aging of the CRT face entailed in the line-idle scan is eliminated, since the present line-ride scan is engaged only when the line is in motion relative to the CRT face. When transport 140 has moved the document by the required amount, it issues a "document-in-place" signal on line 1K to AND 424. Since the other input of gate 424 merely signifies that line riding is in progress, the signal on line 1K is effective to restart line search generator 420. The line-search scan then begins to sweep downwardly from the point to which the line-ride generator 499 had carried it during the document movement. Scan-selection unit 400 then again cycles its scan generators through the sequence described hereinabove. It will now be appreciated that line-ride generator 499 provides a type of seek scan which, however, depends upon the actual motion of the document rather then upon a vertical boundary specified either by the format word or by the line-storage unit 500. In this manner, the entire surface of a completely unformatted document may be rapidly scanned, even though the document is too long to fit within a single read window. Furthermore, this result is achieved without rereading or skipping any character lines thereon.

THE STRIKE GENERATOR

As has been stated, all but one of the individual scan generators shown in FIG. 4 may be of any conventional design, and may be easily implemented by those skilled in the art. The one exception is the strike generator 430, shown in greater detail in FIG. 6. Since much of the logic circuitry of this generator is preferably shared with the line-search generator 420 and with the line-ride generator 499, these units will also be described in greater detail.

OR gate 422 activates line-search generator 420 by setting a latch 601 through an OR gate 602. The set output of latch 601 is transferred through AND 603 to output line 4B to cause the beam control 160 to move the scanning beam downward at a rate of 100 inches per second (D100). This latch output also enables gates 604 and 605, whose other outputs are derived from a latch 606 which is set and reset when the scanning beam passes the horizontal boundary (3A) and the horizontal auxiliary boundary (3B) respectively. The outputs of gates 604 and 605 cause the scanning beam to move horizontally back and forth between these two boundaries at a rate of 5,000 i.p.s. (L5000 and (R5000). Latch 601 also provides an output on line 4L for indicating that line searching is in progress. Thus, generator 420 provides a line-search scan which moves rapidly back and forth and simultaneously downward at a slower rate.

Output line 4L proceeds to an input of gate 431', which replaces the simple AND gate 431 of FIG. 4. Gate 431' differs from gate 431 in that it energizes strike generator 430 only upon sensing two (rather than one) black video hits during a single horizontal sweep. By requiring a plurality of black hits within one sweep, gate 431' is able to avoid false triggering of generator 430 caused by a long vertical mark (LVM) or by a document calibration mark which may appear within the field. A first video hit appearing on line 1A is recorded in latch 611, whose set output is connected to AC gate 612. This gate is enabled by concurrent signals on its two lower inputs, and then is triggered by a positive transition on its "P" input. Thus, the second video hit on line 1A will allow gate 612 to start generator 430. The confinement of the two video hits to the same sweep is accomplished by OR 613, which receives inputs from lines 3A and 3B, to fire single-shot 614, thereby resetting latch 611 whenever either of the horizontal boundaries is encountered by the scanning beam.

Gate 431' activates strike generator 430 by setting latch 621. The immediate effect of this is to fire single-shot 622, whose output passes through AND 623 to signal beam control 160 through output line 4C to move the beam downwardly at 5,000 i.p.s. (D5000) for a predetermined interval. Such a downward increment is desirable in that the video which triggers generator 430 normally occurs at the top of a line, rather then at or near its center. The activation of latch 621 also turns off its reset output, so that one of the inputs from AND 603 is removed, precluding generator 420 from moving the beam downwardly when generator 430 is energized. Gates 604 and 605 remain on, however, so that the horizontal movement of the beam continues.

When the beam next reaches the horizontal auxiliary boundary, AND 624 sets latch 625 to provide the requisite signal on line 4M to long-black detector 332 (FIG. 3) to begin the end-of-document test scan. Line 4M remains up until the horizontal boundary is encountered, at which time AND 626 resets latch 625. Gate 626 also provides the "scan-complete" signal utilized by OR 441 (FIG. 4), and further resets latch 601 through OR 607, which in turn resets latch 621. The long-black detector 332 may then be a simple delay circuit which fires when more than a predetermined amount of black video is received after output line 4M is activated. If sufficient black video is received during the test scan, detector 332 will provide an "end-of-document" signal on line 3F, which will reset latch 601 to deenergize scan generator 420; then, when AND 626 signals the end of the test scan, generator 430 will also be deactivated, and the scan sequence will proceed as described in connection with FIGS. 3 and 4. If, on the other hand, the test scan is completed without detecting the end of the document, AND 626 will deactivate generator 420 by resetting latch 601 through OR 607, and will deactivate generator 430 by resetting latch 625 and by resetting latch 621 through the reset output of latch 601. The "scan-complete" signal then triggers character-search generator 440 through OR 441 (FIT. 4) at a time when the scanning beam is at the horizontal boundary, and the scanning sequence continues as described hereinabove. It may now be appreciated that the generator 430 provides a simple expedient for automatically determining the end of a document by sensing the amount of black within a predetermined area whenever the line-search generator has caused the scanning beam to encounter black video.

The line-ride scan generator 499 is energized when a "-move-document" signal on line 3G causes OR 633 to set latch 631, which causes a signal on line 4K to move the beam downwardly at a speed of 15 i.p.s. (D15). Simultaneously, the reset output of latch 631 disables AND gate 603, while its inverse energizes latch 601 via OR 602. In this way, the scanning beam moves horizontally at a rapid rate between the horizontal boundary and the horizontal auxiliary while moving downwardly at a very low velocity. Since line 4L is now up, a double black video hit sensed on line 1A will cause gate 431+ to fire single-shot 622. But, since AND gate 623 is disabled by latch 631, the single-shot output is instead routed to AND 632, where it causes line 4K to move the scanning beam upwardly at 1,000 i.p.s. (U1000) for a short interval. Thereafter, the beam again moves downwardly at 15 i.p.s. until video is encountered. At the end of the line-ride scan, generator 499 is disengaged by resetting latch 631 through OR 633. Gate 633 is activated either by a "document-in-place" signal on line 1K or by an "end-of-document" signal on line 3F, via gate 607 and latch 601. In this manner, line-ride generator 499 causes the scanning beam to follow a character line as the document moves through the read window. This in turn allows the scan-control unit 150 of the present invention to follow a long document through successive read windows without skipping character lines and without rereading lines previously read.

INTERFACE WITH THE CPU CHANNEL

In view of the above description, it may now be appreciated that the present scan-control apparatus is capable of reading printed characters whose location on a document need not be exactly specified. In its unformatted-document mode (UDM), the entire document is searched for characters. Character lines are found by scanning down a vertical column, one of whose horizontal boundaries is specified by a format-word byte from CPU channel 130. In this mode, the vertical boundary information in the format word may, if desired, be used to start the scanning of the document below the top in order to avoid the scanning of irrelevant information such as headings and the like. In its unformatted-field mode (UFM), the scan-control apparatus utilizes the format word additionally to define upper and lower vertical boundaries of a particular document area to be searched for characters.

Furthermore, only one byte of the format word is necessary to specify the vertical boundary information. Bearing in mind the foregoing description of the scan-control apparatus, this aspect of the invention may be illustrated as follows. Channel 130 contains a list of format words which are to be successively transmitted to the decoder unit 200. The channel causes the first format word to be loaded into decoder unit 200 by sending a "load-format" command; scanning of the field is then commenced by sending a "read" command. The first format word contains representations of the horizontal boundary, the end-of-line boundary and the vertical beginning of the field. When the scanning beam has traversed the first character line found within the field, its vertical coordinate has been recorded in line-storage unit 500, and line 3D signals the channel. Then, if this character line is not to be reread, the channel will enter a second format word into decoder unit 200 by issuing a second "load-format" command. This second format word will contain the same first and second bytes as the first format word, but the vertical coordinate specified therein represents the lower vertical boundary of the field, the upper vertical boundary now being represented by the coordinate stored in line-storage unit 500. That is, after the first character line in an unformatted field has been read, the field is defined as lying between the location of the previous character e.g., and the value specified on line 1H of decoder unit 200. The channel 130 may then be programmed to vertical to issue the second format word at the end of each character line until the scanning beam passes below the format-word vertical boundary specified on line 3J. At this point, the channel will attained, third format word to begin another field, and the above steps will be repeated for this latter field.

The interaction between scan control unit 150 and channel 130 offers great versatility in the scanning of a document. For example, the document fields need not be rectangular in shape. An L-shaped field, e.g., may be specified as follows. A first format word contains the horizontal, end-of-line and upper vertical boundaries of the vertical leg of the field. When the first line has been read, a second word substitutes the lower vertical boundary of the vertical leg for the upper vertical boundary. When the lower boundary is attained, a third format word substitutes the horizontal boundary of the horizontal leg for the corresponding boundary of the vertical leg. Subsequently, a fourth word substitutes the lower vertical boundary of the horizontal leg in place of the preceding vertical boundary.

Additionally, the channel may be programmed so that the number of lines read within a specific field is entered in an interval register. Then, when a predetermined number of lines has been read within that field, the channel may terminate the field even though the specified vertical boundary has not been attained; that is, the format-word vertical boundary in this case is a dummy variable. Also since the "end-of-document" signal (line 3F) will override the end-of-field signal (3J), the end of a field may be specified as coinciding with the end of a document, wherever the document end may occur. Furthermore, it may occur that a designated field contains no information in a particular document. In this event, the detection unit 300 will send an artificial end-of-field signal on line 3J whenever no character lines have been found in the first 1 inch of the field. This feature eliminates the necessity for completely scanning a blank field.

It is also possible, of course, to adapt the basic format-control concepts disclosed herein to the scanning of images other than characters, such as object outlines, fingerprints and nuclear-particle tracks, to name but a few. Many other capabilities, advantages and applications of the present invention will be apparent to those skilled in the scanning arts.

Having thus described a preferred embodiment thereof, we claim as our invention:

1. In a recognition system, a scan-control apparatus for causing a beam control to move a scanning beam in a sequence of scans located relative to a predetermined area, and a data processor for transmitting to said scan-control apparatus at least one command and a format word specifying a plurality of arbitrarily assignable boundaries defining said area, said scan-control apparatus comprising:

a decoder unit responsive to said format word for producing representations of said plurality of boundaries of said predetermined area;

a detection unit responsive to said decoder unit and to said beam control for sensing the location of the scanning beam relative to said boundaries;

a scan-selection unit responsive to said detection unit and to said data processor for producing signals representing said scans and for transmitting selected ones of said signals to said beam control, said scan-selection unit including a seek generator responsive to a first command from said data processor for positioning said beam relative to at least one of said boundaries, a line-search generator responsive to said seek generator for producing a scan for black video in said predetermined area, and a strike generator responsive to said line-search generator for positioning said beam relative to said black video; and a storage unit responsive to said strike generator for recording a representation related to a coordinate of said black video.

2. The combination according to claim 1 wherein said boundary representations indicate a vertical boundary, a horizontal beginning boundary and a horizontal terminating boundary of said predetermined area.

3. In a recognition system, a scan-control apparatus responsive to a data processor for causing a beam control to move a scanning beam in a sequence of scans located relative to a predetermined area, said scan-control apparatus comprising:

a decoder unit responsive to a format word from said data processor for producing representations of a plurality of boundaries of said predetermined area;

a scan-selection unit responsive to said detection unit and to said data processor for producing signals representing said scans and for transmitting selected ones of said signals to said beam control, said scan-selection unit including a seek generator responsive to a first command from said data processor for positioning said beam relative to at least one of said boundaries, a line-search generator responsive to said seek generator for producing a scan for black video in said predetermined area, a strike generator responsive to said line-search generator for positioning said beam relative to said black video a latch having a set state responsive to a second command from said data processor and having a reset state responsive to said strike generator, means responsive to said seek generator and to said set state for activating said line-search generator, and means responsive to said seek generator and to said reset state for producing a recognition scan in said area; and a storage unit responsive to said strike generator for recording a representation related to a coordinate of said black video.

4. In a recognition system, a scan-control apparatus responsive to a data processor for causing a beam control to move a scanning beam in a sequence of scans located relative to a predetermined area, said scan-control apparatus comprising:

a decoder unit responsive to a format word from said data processor for producing representations of a vertical boundary, a horizontal beginning boundary and a horizontal terminating boundary of said predetermined area;

a detection unit responsive to said decoder unit and to said beam control for sensing the location of said scanning beam relative to said boundaries;

a scan-selection unit responsive to said detection unit and to said data processor for producing signals representing said scans and for transmitting selected ones of said signals to said beam control, said scan-selection unit including a seek generator responsive to a first command from said data processor for positioning said beam relative to at least one of said boundaries, a line-search generator responsive to said seek generator for producing a scan for black video in said predetermined area, and a strike generator responsive to said line-search generator for positioning said beam relative to said black video; and a storage unit responsive to said strike generator for recording a representation related to a coordinate of said black video, wherein said storage unit includes means responsive to said strike generator for causing said seek generator to position said beam at the intersection of said vertical boundary and said horizontal beginning boundary when said strike generator has not been activated within said area, and for causing said seek generator to position said beam at the intersection of said horizontal beginning boundary and the representation recorded in said storage means when said strike generator has been activated within said area.

5. The combination according to claim 4 wherein said detection unit includes means responsive to said strike generator for terminating said line-search scan at a predetermined distance from said vertical boundary when said strike generator has not been activated within said area.

6. The combination according to claim 4 wherein said detection unit includes means responsive to said strike generator for terminating said line-search scan at said vertical boundary when said strike generator has been activated within said area.

7. In a recognition system, a scan-control apparatus responsive to a data processor for causing a beam control to move a scanning beam in a sequence of scans located relative to a predetermined area, said scan-control apparatus comprising:

a decoder unit responsive to a format word from said data processor for producing representations of a plurality of boundaries of said predetermined area;

a detection unit responsive to said decoder unit and to said beam control for sensing the location of said scanning beam relative to said boundaries;

a scan-selection unit responsive to said detection unit and to said data processor for producing signals representing said scans for transmitting selected ones of said signals to said beam control, said scan-selection unit including a seek generator responsive to a first command from said data processor for positioning said beam relative to at least one of said boundaries, a line-search generator responsive to said seek generator for producing a scan for black video in said predetermined area, a strike generator responsive to said line-search generator for positioning said beam relative to said black video, a generator responsive to said strike generator for producing a character-search scan within said area; and a storage unit responsive to said strike generator for recording a representation related to a coordinate of said black video.

8. The combination according to claim 7 wherein said scan-selection unit includes a generator responsive to said character-search generator for producing a normalizing scan over said black video, and for producing signals denoting that said black video has a valid height and a valid width.

9. The combination according to claim 8 wherein said scan-selection unit includes means responsive to the absence of said valid-height signal for activating said character-search generator, and means responsive to the absence of said valid-width signal for activating said line-search generator.

10. The combination according to claim 8 wherein said scan-selection unit includes an initialization generator responsive to said valid-height and said valid-width signal for positioning said beam relative to said black video.

11. The combination according to claim 10 wherein said scan-selection unit includes a generator responsive to said initialization generator for producing a recognition scan over said black video.

12. The combination according to claim 11 wherein said detection unit includes means for sensing the absence of said black video over a first predetermined interval during said recognition scan; and wherein said scan-selection unit includes a generator responsive to said sensing means for producing a high-speed scan within said area.

13. The combination according to claim 12 wherein said detection unit includes means for sensing the absence of said black video over a second predetermined interval; and wherein said scan-selection unit includes means responsive thereto for activating said normalizing generator upon the presence of black video before the expiration of said second interval, and for activating said line-search generator upon the absence of black video before said expiration.

14. In a scan-control apparatus for a character-recognition system having a transport apparatus and having a read window for a scanning beam, the combination comprising:

a generator for producing a line-search scan within a predetermined area of said read window;

a strike generator responsive to a video detector for positioning said scanning means relative to black video detected during said line-search scan;

means for producing a test scan over an area relative to said black video;

means for sensing the presence of black video over a predetermined portion of said area and means responsive to said sensing means for producing an "end-of-document" signal;

means for sensing the position of said beam relative to a boundary of said read window;

means responsive thereto for causing said transport apparatus to move a document relative to said read window; and .

a generator for producing a line-ride scan causing said beam to follow the movements of said document.

15. The combination according to claim 14 including means for sensing a "last window" condition of said document, and means responsive thereto for inhibiting said line-ride generator and form producing said "end-of-document" signal.

16. The combination according to claim 14 including means responsive to a "document-in-place" signal from said transport apparatus during said line-ride scan for activating said line-search generator.

17. In a recognition system scan-control apparatus responsive to a data processor for controlling a scanning beam, the combination comprising:

a generator responsive to a format word from said data processor for producing search scans over a predetermined area of a document to be read;

means for sensing the presence of data in said area during said search scan; and a storage unit responsive to said sensing means and to the position of said scanning beam for recording a digital representation of a coordinate related to the position of said data, and for causing said generator to be further responsive to said digital representation, said storage unit including a clocked counter activated by said sensing means; a register cycled by said counter and responsive to a comparison signal for producing said digital representation; a converter for producing said digital representation; a converter for producing an analog signal indicative of said digital representation; and a comparator responsive to said analog signal and to the position of said scanning beam for producing said comparison signal.

18. The combination according to claim 17 wherein said storage unit further includes:

a latch having a set state responsive to said counter and to said sensing means; and switching means responsive to said set state for coupling said comparator to said generator.

* * * * *